Feb. 27, 1934. J. K. WIRTH 1,949,135
METHOD OF MANUFACTURING VESSELS
Filed Jan. 3, 1930
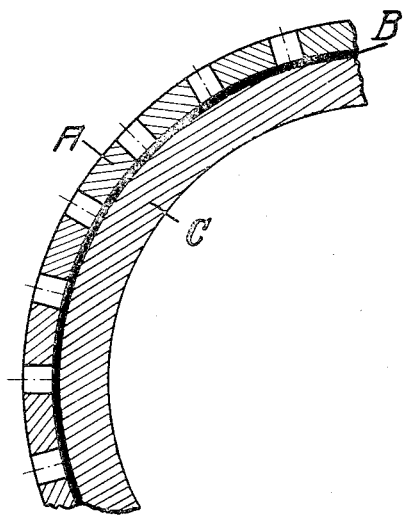
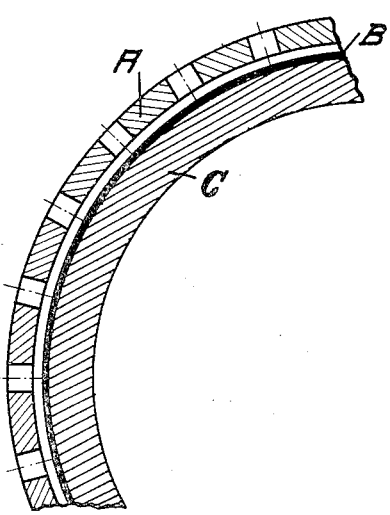
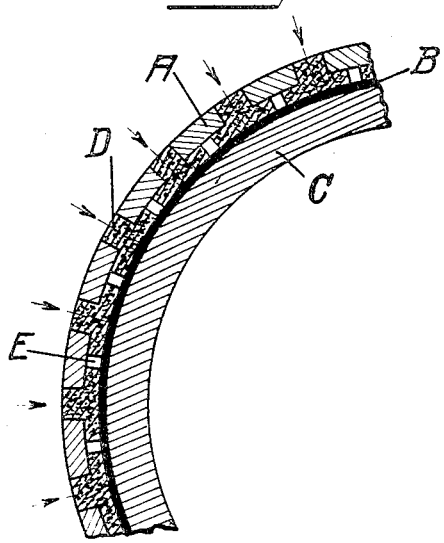
Inventor:
Johann Karl Wirth
by
Langner, Parry, Card Langner
Attys Patented Feb. 27, 1934

1,949,135

UNITED STATES PATENT OFFICE 1,949,135

METHOD OF MANUFACTURING VESSELS

Johann Karl Wirth, Berlin, Germany, assignor to Säureschutz Gesellschaft mit beschrankter Haftung, Berlin-Altglienicke, Germany Application January 3, 1930, Serial No. 418,308 In Germany April 26, 1929

4 Claims. (Cl. 18—59)

It has been known to manufacture large vessels, containers, receptacles and the like with phenolaldehyde condensation products having an iron or metallic base, which is provided with holes, slots, perforations, recesses and the like and which is coated by a layer of plastic artificial resin not only covering the surface of the metal but also filling the said recesses. According to this known method attempts have been made to overcome the stresses occurring from the shrinkage in the hardening of the artificial resins by forcing the coating in the recesses to shrink in the direction of the thickness of the coating and not in the direction of the length or of the circumference.

Now it has been found out that it is better to apply the method in such a way so as not to fill up the recesses when coating the base to ensure a free shrinkage in every direction for the coating during the hardening process, and then to fill in the artificial resin into the holes, perforations, recesses and the like from the outside of the vessel being manufactured and thus force the plastic mass into the recesses between the coating layer and the metallic base.

The new process has the great advantage over the method known that a coating layer of artificial resins is obtained which is free of any stresses and therefore possesses a greater resistance against shock and strain and especially against temperature-influences.

According to the invention the new process is performed by closing the holes, recesses and the like in the base before bringing the layer of artificial resin against the base and thereby preventing the layer from entering into the holes. For doing so it is only necessary to place a layer of paper, pasteboard or the like upon the surface of the metallic perforated base upon which the artificial resin is to be coated.

In the accompanying drawing in Figs. 1–3 the three steps of the process according to the invention are illustrated.

According to Fig. 1 the plate A of the vessel to be lined with the protective layer of artificial resin is provided with perforations D in the known manner. These perforations are closed by a layer B of paper secured by means of strong glue to the surface to be protected, and then the layer of plastic artificial resin is placed upon the paper.

During the hardening process shrinkage takes place and the layer of artificial resin as well as the paper impregnated by artificial resin become spaced from the base as is shown in Fig. 2.

Now the perforations D are filled with artificial resin pressed into the space between the metallic base A and the layer B—C. The plastic mass is brought in from the outside of the vessel as indicated by the arrows in Fig. 3. In case the plastic mass forced through the perforations D leaves free spaces E this will not be disadvantageous. The paper may be impregnated with a suitable solution before securing it to the base so as to attain a decomposition of the paper when the coat of artificial resin is hardened. Thus it is possible to connect the plastic mass in the perforations directly with the layer C of artificial resin. It is furthermore possible to arrange recesses in the hardened layer of artificial resin from the outside of the vessel by passing a suitable tool through the perforations and thus assist the connection of the plastic mass filled into the perforations with the coating layer. The perforations D may also be filled with other plastic masses than artificial resin such as cement.

As a solution for the impregnation of the paper layer an aqueous solution of sodium-bisulphate may be used.

I claim:

1. A method of manufacturing vessels and the like, especially for chemical purposes from phenol-aldehyde condensation products coated upon a perforated or slotted metallic base, comprising covering the perforations upon the surface of said base with a paper-like material, then coating said covering of paper-like material with a layer of said condensation product, then hardening said layer, and then filling the perforations in said base by pressing with said condensation product until a good bond with said layer of said condensation product is obtained and then hardening said condensation product.

2. A method of manufacturing vessels and the like especially for chemical purposes from phenol-aldehyde condensation products coated upon a metallic, perforated or slotted base, comprising covering said perforations in said base with a layer of paper, then applying to said layer of paper a coating of said condensation product, then hardening said coating, then forcing said condensation product through the perforations by pressing until a good bond is secured between said base and said coating and then hardening said condensation product.

3. A method for manufacturing vessels and the like especially for chemical purposes from phenol-aldehyde condensation products coated upon a perforated, recessed or slotted metallic base, comprising impregnating paper with a sodium bisulphate to destroy said paper when heated, then covering said perforations of said base with said paper, then coating said paper with a layer of said condensation product, then hardening said coating, then forcing said condensation product by pressing into the space between said base and said hardened, coated layer and the perforations to secure a good bond between said coated layer and said base and then hardening said condensation product.

4. A method for manufacturing vessels and the like especially for chemical purposes from phenol-aldehyde condensation products coated upon a perforated, recessed or slotted metallic base comprising impregnating paper with sodium bisulphate to destroy said paper when heated, then covering said perforations of said base with said paper, then coating said paper with a layer of said condensation products, then hardening said coating, then forcing said condensation product into the space between said base and said hardened coated layer and the perforations by pressing to secure a good bond between said coated layer and said base and then hardening said condensation product.

JOHANN KARL WIRTH.